United States Patent
Peng et al.

(10) Patent No.: US 8,219,163 B2
(45) Date of Patent: Jul. 10, 2012

(54) SLIDE MECHANISM FOR SLIDE-TYPE PORTABLE ELECTRONIC DEVICE

(75) Inventors: Zhi-Gang Peng, Shenzhen (CN); Zhi-Qiang Shi, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 289 days.

(21) Appl. No.: 12/559,613

(22) Filed: Sep. 15, 2009

(65) Prior Publication Data
US 2010/0087234 A1 Apr. 8, 2010

(30) Foreign Application Priority Data
Oct. 6, 2008 (CN) .......................... 2008 1 0304755

(51) Int. Cl.
*H04M 1/00* (2006.01)

(52) U.S. Cl. ............. 455/575.4; 455/550.1; 455/556.1; 455/575.1; 455/466; 408/1 R; 408/115 R; 408/77; 408/800; 408/200; 174/66; 174/67

(58) Field of Classification Search ............ 455/575.4, 455/556.1, 575.1, 466, 90.3, 550.1; 174/66, 174/67; 408/1 R, 115 R, 77, 88, 200
See application file for complete search history.

(56) References Cited

U.S. PATENT DOCUMENTS

| | | | |
|---|---|---|---|
| 6,782,242 B1 * | 8/2004 | Koleda et al. ............... 455/90.3 |
| 6,782,993 B2 * | 8/2004 | Bernard et al. ............... 198/585 |
| 7,731,313 B2 * | 6/2010 | Chen ...................... 312/334.45 |
| 7,795,534 B2 * | 9/2010 | Lin et al. ........................ 174/66 |
| 2006/0078235 A1 * | 4/2006 | Chen et al. ........................ 384/18 |
| 2007/0270193 A1 * | 11/2007 | Hsieh ........................ 455/575.1 |
| 2008/0132303 A1 * | 6/2008 | Naukkarinen et al. ...... 455/575.4 |
| 2009/0029749 A1 * | 1/2009 | Lee ............................ 455/575.4 |
| 2009/0117953 A1 * | 5/2009 | Oh .............................. 455/575.1 |
| 2009/0159767 A1 * | 6/2009 | Ko ................................. 248/274.1 |
| 2009/0247248 A1 * | 10/2009 | Ito ............................... 455/575.4 |
| 2010/0134973 A1 * | 6/2010 | Lee ........................... 361/679.56 |
| 2010/0234065 A1 * | 9/2010 | Chiu ........................... 455/556.1 |
| 2011/0100993 A1 * | 5/2011 | Wu et al. ...................... 220/348 |

* cited by examiner

*Primary Examiner* — Rafael Pérez-Gutiérrez
*Assistant Examiner* — Joseph Arévalo
(74) *Attorney, Agent, or Firm* — Altis Law Group, Inc.

(57) ABSTRACT

A slide mechanism comprises a main plate forming two guiding groove portions, and a slide plate forming two guiding flanges engaging with the guiding groove portions respectively. The slide mechanism includes a plurality of rollers received in the guiding groove portions to guide the guiding flanges to slide relative to the guiding groove portions. The invention also discloses a portable electronic device applying the slide mechanism.

8 Claims, 6 Drawing Sheets

SLIDE MECHANISM FOR SLIDE-TYPE PORTABLE ELECTRONIC DEVICE

BACKGROUND

1. Technical Field

The present disclosure generally relates to sliding mechanisms and, particularly, a sliding mechanism used in portable electronic devices.

2. Description of Related Art

Slide-type portable electronic devices have been increasingly popular among portable electronic devices. The slide-type portable electronic device generally includes two housings and a slide mechanism connected to the two housings, the slide mechanism can drive one of the housings to slide over the other to open/close the portable electronic device. The slide mechanism includes a slide plate and a main plate engaging with the slide plate. One of the slide plate and the main plate defines guiding grooves, and the other forms rails accordingly engaging with the guiding grooves.

However, each of the rails is received in the corresponding guiding groove with the rail sidewall abutting the peripheral wall of the groove. The friction and the wearing of the rail sidewalls and the peripheral walls of the grooves can be difficult to overcome.

Therefore, there is room for improvement within the art.

BRIEF DESCRIPTION OF THE DRAWINGS

Many aspects of the exemplary slide mechanism and a portable electronic device using the slide mechanism can be better understood with reference to the following drawings. The components in the various drawings are not necessarily drawn to scale, the emphasis instead being placed upon clearly illustrating the principles of the slide mechanism and the portable electronic device. Moreover, in the drawings, like reference numerals designate corresponding parts throughout the diagrams.

DETAILED DESCRIPTION OF THE EMBODIMENT

Figure 1:
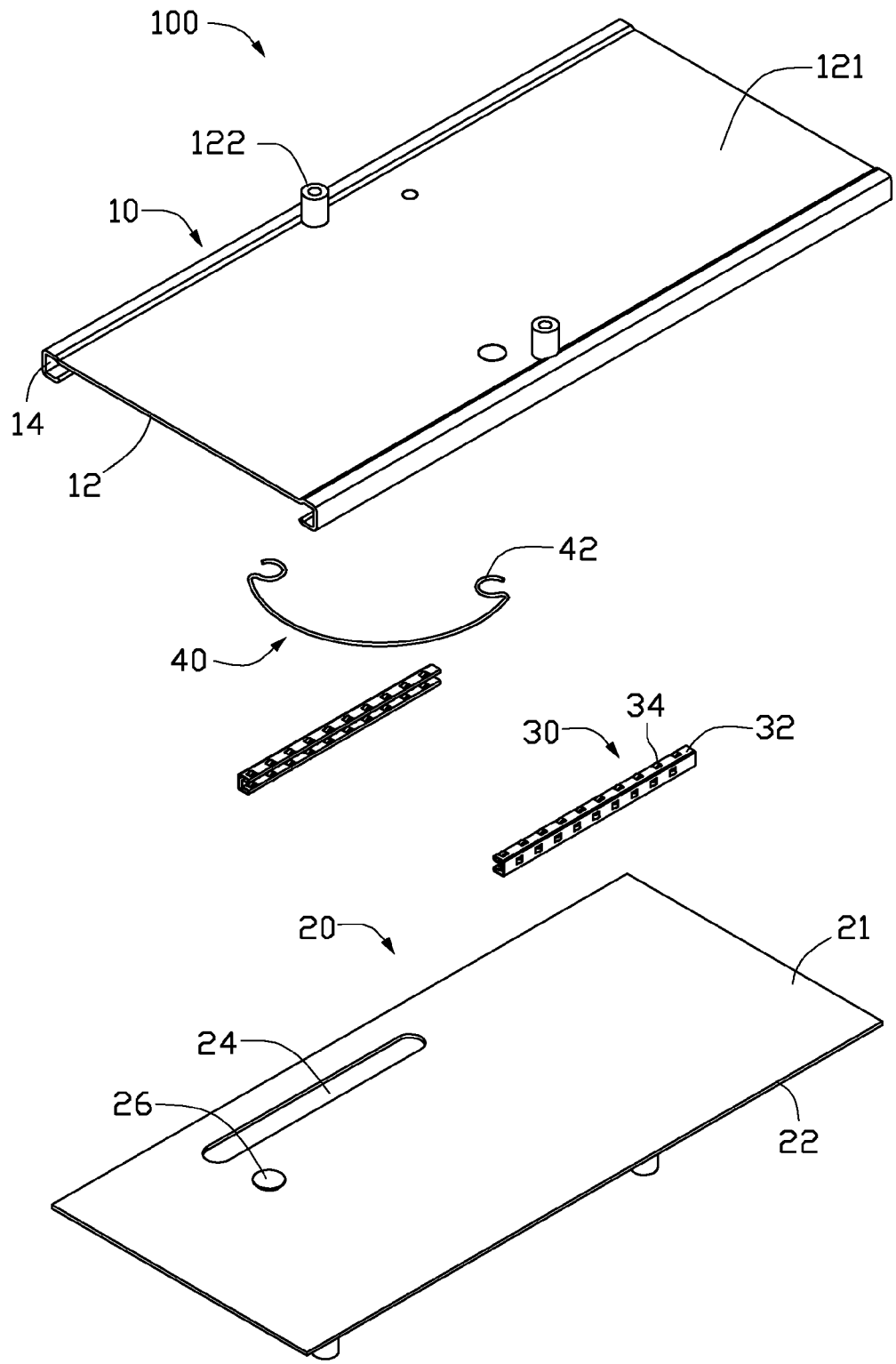
FIG. 1 is a disassembled downward view of the slide mechanism, according to an exemplary embodiment.
Figure 2:
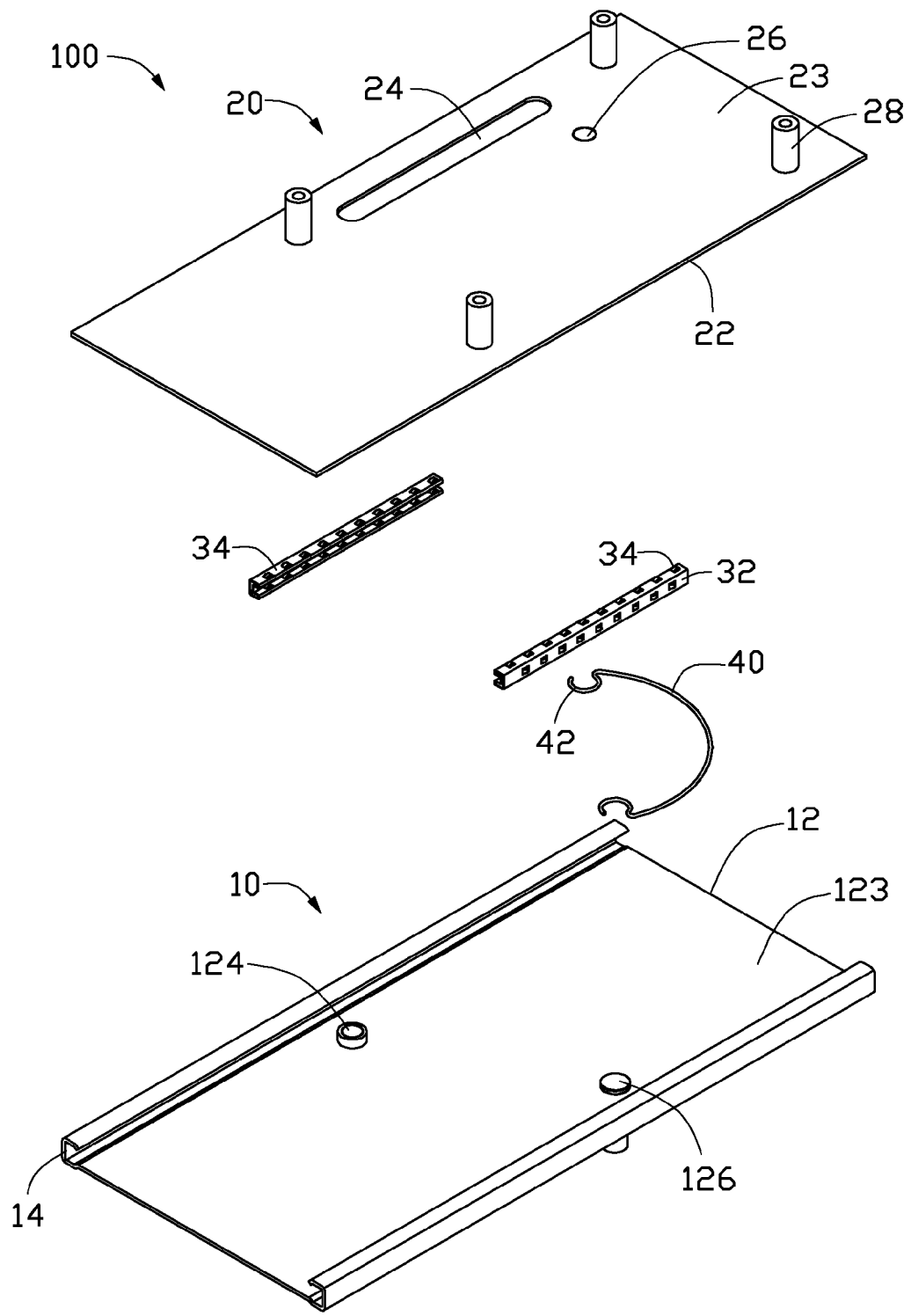
FIG. 2 is a disassembled upward view of the slide mechanism shown in FIG. 1.

FIGS. 1 and 2 show a slide mechanism 100 used in a portable electronic device such as a mobile phone, a digital camera, etc. The slide mechanism 100 includes a main plate 10, a slide plate 20, two guide bodies 30 assembled in the main plate 10, and an elastic member 40 connected with the main plate 10 and the slide plate 20.

The main plate 10 includes a plate portion 12 and two guiding groove portions 14 at two sides of the plate portion 12. The plate portion 12 is substantially flat and includes an upper surface 121 and a lower surface 123. The upper surface 121 has two first connecting poles 122 protruding therefrom. Each of the first connecting poles 122 is adjacent to one of the two sides of the plate portion 12 and used to connect to a housing of an electronic device. The lower surface 123 has a guiding pole 124 and a first fixing pole 126 protruding therefrom. The guiding pole 124 is a column and located adjacent to a side of the plate portion 12. The first fixing pole 126 is positioned adjacent to the other side of the plate portion 12 and used to fix with the elastic member 40. The guiding groove portions 14 are arranged oppositely and configured for receiving the two guide bodies 30 respectively.

The slide plate 20 is substantially flat and includes two guide flanges 22 at each side thereof. The slide plate 20 has an upper surface 21 and a lower surface 23. The upper surface 21 has a second fixing pole 26 protruding therefrom, the lower surface 23 has a plurality of second connecting poles 28 protruding therefrom. The second connecting poles 28 are near the two sides of the slide plate 20 and used to connect to another housing of the electronic device. The slide plate 20 defines an elongate guiding hole 24 adjacent to a side thereof. The guiding hole 24 extends along longitudinal direction of the slide plate 20. The guiding hole 24 is used to engage the guiding pole 124 of the main plate 10 to limit the sliding of the slide plate 20 relative to main plate 10.

Figure 3:
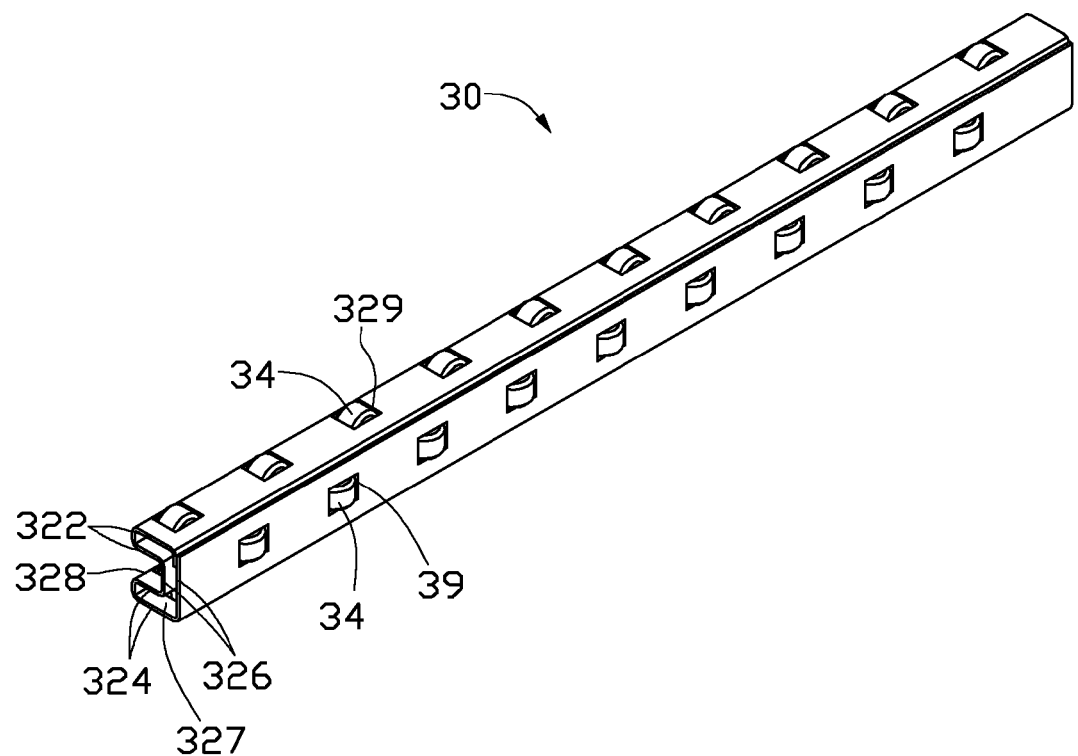
FIG. 3 is a schematic view of the guide body of the slide mechanism shown in FIG. 1.

Referring to FIG. 3, the guide body 30 is used to guide the sliding of the slide plate 20. The guide body 30 includes a sleeve 32 and a plurality of rollers 34 assembled in the sleeve 32. The sleeve 32 can be received in the guiding groove portions 14. The sleeve 32 includes a first clamp wall 322, a second clamp wall 324 parallel with the first clamp wall 322, and a connecting wall 326 perpendicular to the clamp wall 322, 324. The clamp wall 322, 324 and the connecting wall 326 connect with each other and cooperatively enclose a space 327 inside the sleeve 32 and a receiving recess 328 exposed to outside. The space 327 can receive portions of the rollers 34. The receiving recess 328 receives the guide flange 22 of the slide plate 20. The clamp wall 322, 324 and the connecting wall 326 define a plurality of holes 329 to receive the rollers 34. The holes 329 can be round, rectangular or other shapes. Accordingly, the rollers 34 can be spherical or columnar and of other corresponding shapes. When the rollers 34 are assembled in the sleeve 32, each roller 34 is rotatably held in and partially exposed out of the corresponding hole 329.

The elastic member 40 is a curved metallic strip and has a fixing end 42 at each end. The two fixing ends 42 are used to fix with the first fixing pole 126 of the main plate 10 and the second fixing pole 26 of the slide plate 20 respectively.

During assembling of the slide mechanism 100, the guide bodies 30 can be fabricated by punching of a metal piece, embedding of rollers 34 into the metal piece. The guide bodies 30 are received in the guiding groove portions 14 of the main plate 10. The rollers 34 resist the inner surface of the guiding groove portions 14. The slide plate 20 is mounted to the main plate 10. The guiding flanges 22 are received in the receiving recesses 328 of the guide bodies 30 respectively, and the rollers 34 further resist the guiding flange 22. The guiding pole 124 of the main plate 10 is inserted into the guiding hole 24 of the slide plate 20. The elastic member 40 is assembled between the main plate 10 and the slide plate 20, accordingly, the two fixing ends 42 are fixed with the first fixing pole 126 and the second fixing pole 26 respectively.

Figure 4:
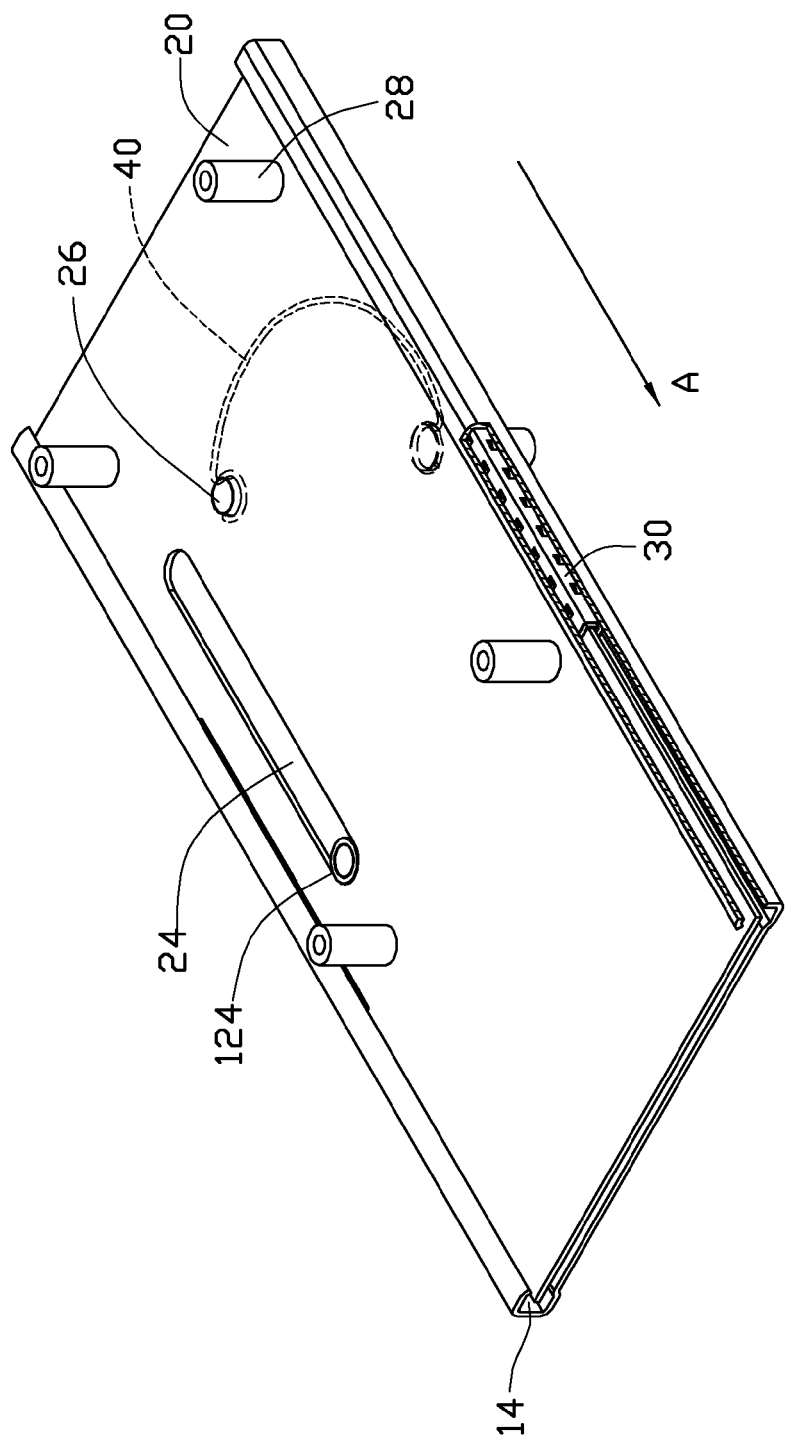
FIG. 4 is an assembled view of the slide mechanism shown in FIG. 1.

Referring to FIG. 4, when the slide plate 20 is closed relative to the main plate 10, the guiding pole 124 resist an end of the guiding hole 24. The elastic member 40 is expanded. When the slide plate 20 is pushed to slide along the illustrated direction of arrow A, the elastic member 40 is compressed and accumulates potential elastic energy. After the slide plate 20 slides past a predetermined position, the elastic member 40 extends and releases the elastic energy to automatically drive the slide plate 20 to slide until the guiding pole 124 resists the other end of the guiding hole 24. At this time, the slide plate 20 is opened relative to the main plate 10. The closing of the slide plate 20 is reversed to opening the slide plate 20 along the main plate 10. During the opening or closing of slide plate 20, the rollers 34 roll along the guiding groove portions 14 and the guide flanges 22, and thus reduce the friction of the slide plate 20 and the main plate 10. The slide plate 20 can slide very smoothly relative to the main plate 10.

Figure 5:
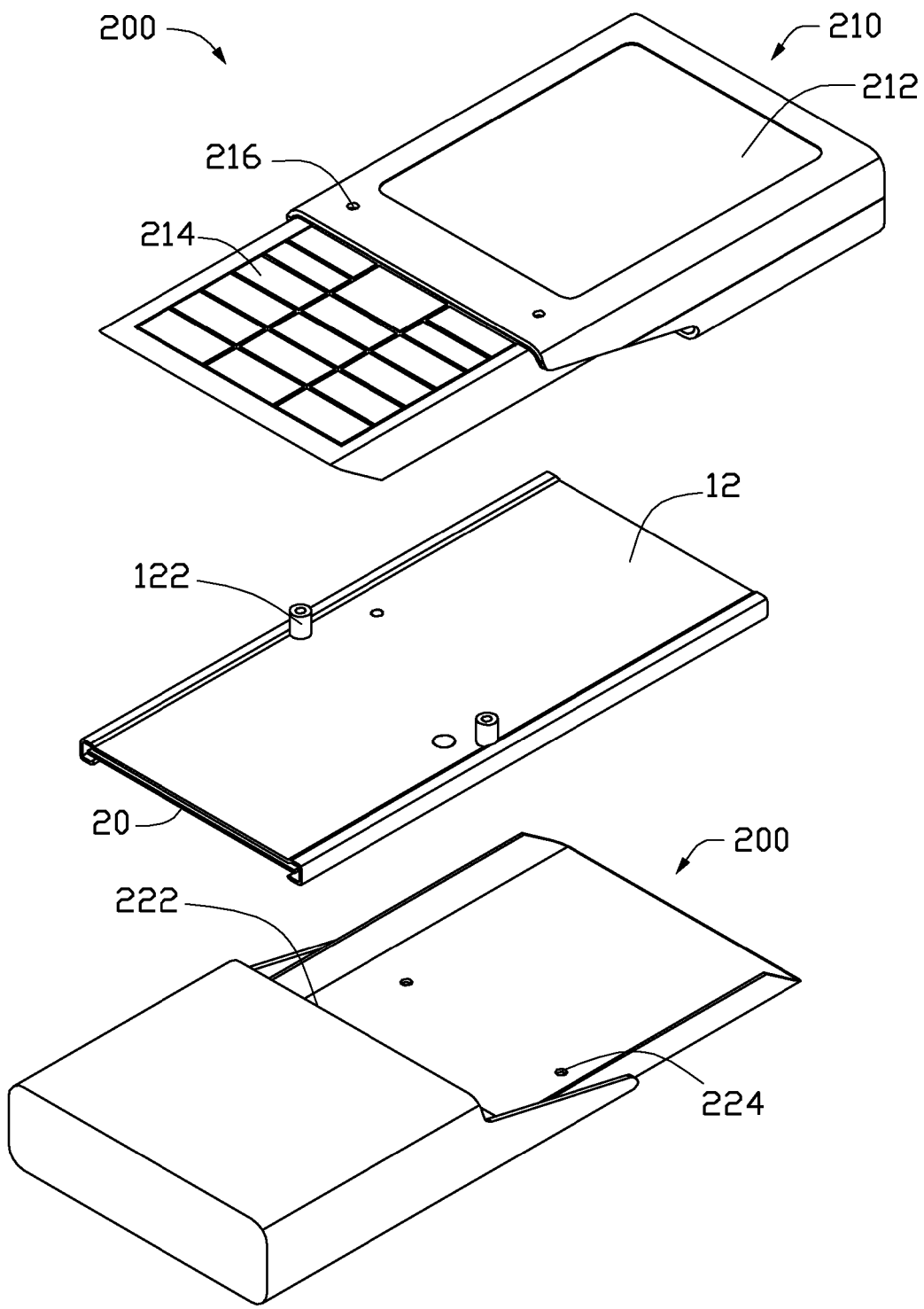
FIG. 5 is a disassembled view of a portable electronic device applying the slide mechanism shown in FIG. 1.
Figure 6:
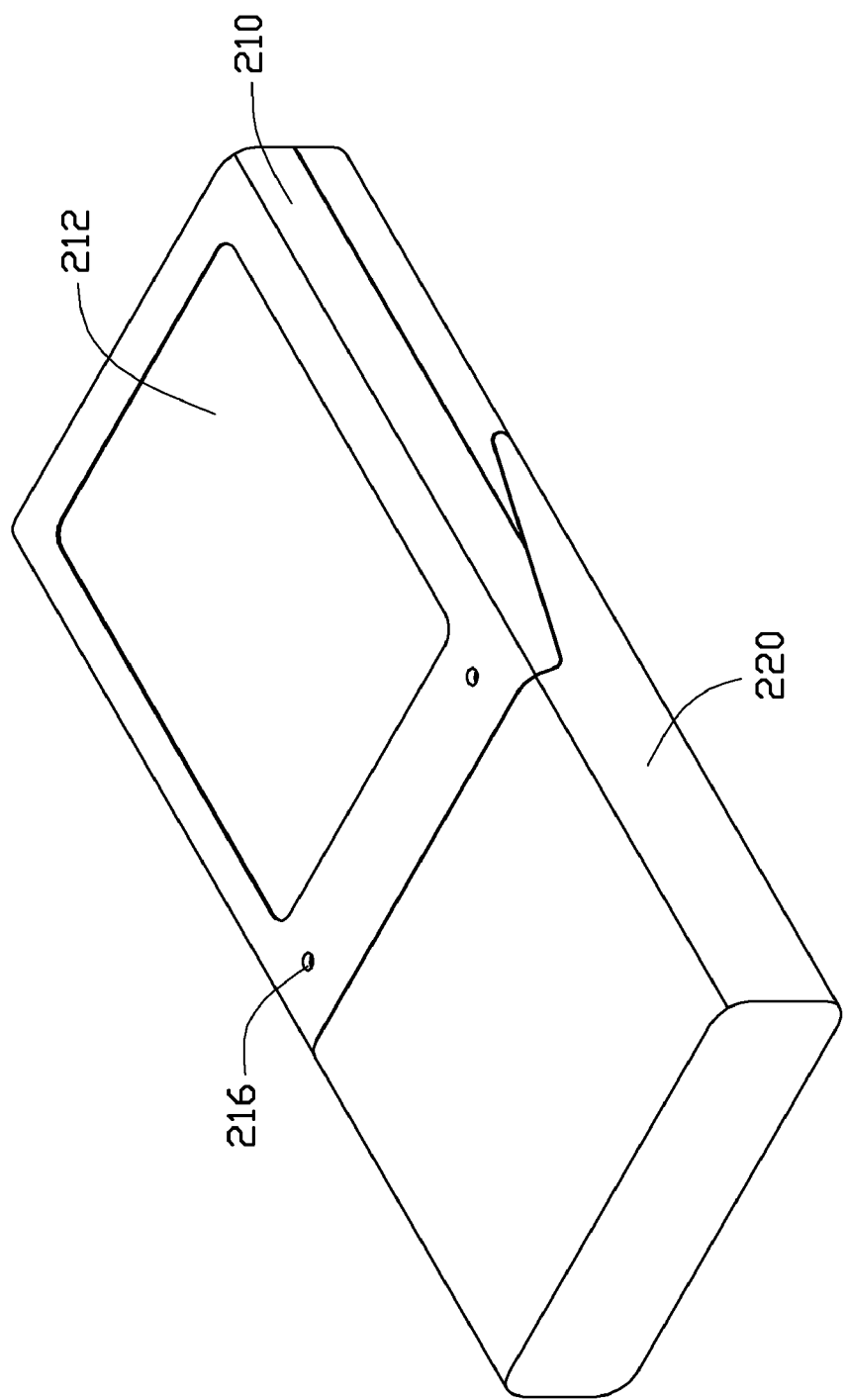
FIG. 6 is an assembled view of the portable electronic device shown in FIG. 5.

Referring to FIGS. 5 and 6, the slide mechanism 100 is applied to a portable electronic device 200. The portable electronic device 200 includes a cover 210 and a housing 220. The cover 210 has a display window 212 and a keypad 214. The cover 210 defines two first connecting holes 216 to engage with the first connecting poles 122 of the main plate 10 respectively, thus, the cover 210 is secured to the main plate 10. The housing 220 defines a receiving room 222 to receive the keypad 214 and two second connecting holes 224 to engage with the second connecting poles 28 of the slide plate 20, thus, the housing 220 is secured to the slide plate 20. The cover 210 can slide with respect to the housing 220 according to the opening or closing of the slide mechanism 100.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A slide mechanism, comprising:
   a main plate forming two guiding groove portions;
   a slide plate forming two guiding flanges engaging with the guiding groove portions respectively; and
   a plurality of rollers, each of the rollers received in corresponding one guiding groove portion, directly contacting with the corresponding one guiding groove portion and the corresponding one guide flange, rolling along the corresponding one guiding groove portion and the corresponding one guide flange, to guide the guiding flanges to slide relative to the guiding groove portions;
   wherein the slide mechanism includes two sleeves, the rollers are assembled in the sleeves and forms two guide bodies, the two guide bodies are assembled in the two guiding groove portions; and
   wherein the sleeve includes a first clamp wall, a second clamp wall parallel with the first clamp wall, and a connecting wall perpendicularly connecting to the first clamp wall and the second clamp wall, all of which cooperatively enclose a space inside the sleeve and a receiving recess exposed to outside, the rollers are received in the space and comprises three arrays of rollers laterally arranged, the receiving recess receives the guide flange of the slide plate.

2. The slide mechanism as claimed in claim 1, wherein the first clamp wall, the second clamp wall and the connecting wall define a plurality of through holes to hold the rollers.

3. The slide mechanism as claimed in claim 1, wherein the slide mechanism includes an elastic member, the elastic member connects the main plate and the slide plate respectively.

4. The slide mechanism as claimed in claim 1, wherein the main plate protrudes a guiding pole, the slide plate defines guiding hole, the main plate is attached to the slide plate, and the guiding pole engages with the guiding hole.

5. A slide mechanism, comprising:
   a main plate forming two guiding groove portions;
   a slide plate forming two guiding flanges; and
   two guide bodies assembled with a plurality of rollers, the two guide bodies are assembled in the two guiding groove portions respectively, the guiding flanges engage with the two guiding groove portions and the rollers directly contacts with and rolls along the guiding flanges and the guiding groove portions to guide the guiding flanges to slide relative to the guiding groove portions;
   wherein the guide body includes a sleeve, the sleeve includes a first clamp wall, a second clamp wall parallel with the first clamp wall and a connecting wall perpendicularly connecting to the first clamp wall and the second clamp wall, all of which cooperatively enclose a space inside the sleeve and a receiving recess exposed to outside, rollers are received in the space, the receiving recess receives the guide flange of the slide plate;
   wherein the rollers comprises three arrays of rollers laterally arranged.

6. The slide mechanism as claimed in claim 5, wherein the first clamp wall, the second clamp wall and the connecting wall define a plurality of through holes, the holes are used to hold the rollers.

7. A portable electronic device, comprising:
   a housing;
   a cover; and
   a slide mechanism engaged with the cover and housing and configured to drive the cover to slide relative to the housing,
   wherein slide mechanism comprises a main plate forming two guiding groove portions and a slide plate forming two guiding flanges engaging with the guiding groove portions respectively, a plurality of rollers, the rollers are received in the guiding groove portions and directly contacts with and rolls along the guiding flanges and the guiding groove portions to guide the guiding flanges to slide relative to the guiding groove portions; and
   wherein the slide mechanism includes two sleeves, the rollers are assembled in the sleeves and forms two guide bodies, the two guide bodies are assembled in the two guiding groove portions; wherein the sleeve includes a first clamp wall, a second clamp wall parallel with the first clamp wall, and a connecting wall perpendicularly connecting to the first clamp wall and the second clamp wall, all of which cooperatively enclose a space inside the sleeve and a receiving recess exposed to outside, the rollers are received in the space and comprises three arrays of rollers laterally arranged, the receiving recess receives the guide flange of the slide plate.

8. The portable electronic device as claimed in claim 7, wherein the first clamp wall, the second clamp wall and the connecting wall define a plurality of through holes to hold the rollers.

* * * * *